(12) United States Patent
McCollum et al.

(10) Patent No.: US 7,367,705 B2
(45) Date of Patent: May 6, 2008

(54) LONG CURVED WEDGES IN AN OPTICAL FILM

(75) Inventors: Timothy A. McCollum, Westlake, OH (US); Jeffery R. Parker, Richfield, OH (US); Robert Bourdelais, Pittsford, NY (US); Cheryl Brickey, Greer, SC (US); Chris Brophy, Pittsford, NY (US); Junwon Lee, Webster, NY (US); Ronald J. Sudol, Brighton, NY (US)

(73) Assignee: Solid State Opto Limited (VG)

( * ) Notice: Subject to any disclaimer, the term of this patent is extended or adjusted under 35 U.S.C. 154(b) by 88 days.

(21) Appl. No.: 11/265,900

(22) Filed: Nov. 3, 2005

(65) Prior Publication Data

US 2006/0092490 A1 May 4, 2006

Related U.S. Application Data

(60) Provisional application No. 60/624,894, filed on Nov. 4, 2004.

(51) Int. Cl.
*F21V 7/09* (2006.01)

(52) U.S. Cl. .................. 362/627; 362/617; 362/627; 362/606; 359/619; 359/24; 385/49; 385/130

(58) Field of Classification Search .............. None
See application file for complete search history.

(56) References Cited

U.S. PATENT DOCUMENTS

| | | | |
|---|---|---|---|
| 3,043,947 A | 7/1962 | Albinger, Jr. | |
| 3,328,570 A | 6/1967 | Balchunas | |
| 3,752,974 A | 8/1973 | Baker et al. | |
| 3,892,959 A | 7/1975 | Pulles | |
| 3,958,113 A | 5/1976 | Termohlen | |
| 4,043,636 A | 8/1977 | Eberhardt et al. | |
| 4,257,084 A | 3/1981 | Reynolds | |
| 4,446,508 A | 5/1984 | Kinzie | |
| 4,542,449 A | 9/1985 | Whitehead | |
| 4,573,766 A | 3/1986 | Bournay, Jr. et al. | |
| 4,630,895 A | 12/1986 | Abdala, Jr. et al. | |
| 4,714,983 A | 12/1987 | Lang | |
| 4,729,185 A | 3/1988 | Baba | |
| 4,751,615 A | 6/1988 | Abrams | |
| 4,765,701 A | 8/1988 | Cheslak | |
| 4,906,070 A | 3/1990 | Cobb, Jr. | |
| 4,974,122 A | 11/1990 | Shaw | |
| 4,975,808 A | 12/1990 | Bond et al. | |
| 4,978,952 A | 12/1990 | Irwin | |
| 5,005,108 A | 4/1991 | Pristash et al. | |
| 5,027,258 A | 6/1991 | Schoniger et al. | |
| 5,056,892 A | 10/1991 | Cobb, Jr. | |
| 5,070,431 A | 12/1991 | Kitazawa | |
| 5,093,765 A | 3/1992 | Kashima et al. | |
| 5,134,549 A | 7/1992 | Yokoyama | |
| 5,136,483 A | 8/1992 | Schoniger et al. | |
| 5,207,493 A | 5/1993 | Murase et al. | |

(Continued)

*Primary Examiner*—Sandra O'Shea
*Assistant Examiner*—Danielle Dunn
(74) *Attorney, Agent, or Firm*—Renner, Otto, Boisselle & Sklar, LLP

(57) ABSTRACT

The invention relates to a light redirecting polymeric film comprising a plurality of polymeric individual optical elements wherein the elements comprise curved wedge shaped features in the plane of the film, having a length in the range of 800 to 4000 micrometers.

38 Claims, 12 Drawing Sheets

U.S. PATENT DOCUMENTS

| | | |
|---|---|---|
| 5,262,928 A | 11/1993 | Kashima et al. |
| 5,283,673 A | 2/1994 | Murase et al. |
| 5,339,179 A | 8/1994 | Rudisill et al. |
| 5,349,503 A | 9/1994 | Blonder et al. |
| 5,375,043 A | 12/1994 | Tokunaga |
| 5,377,084 A | 12/1994 | Kojima et al. |
| 5,390,085 A | 2/1995 | Mari-Roca et al. |
| 5,394,308 A | 2/1995 | Watanabe et al. |
| 5,467,208 A | 11/1995 | Kokawa et al. |
| 5,467,417 A | 11/1995 | Nakamura et al. |
| 5,485,291 A | 1/1996 | Qiao et al. |
| 5,590,945 A | 1/1997 | Simms |
| 5,598,280 A | 1/1997 | Nishio et al. |
| 5,600,462 A | 2/1997 | Suzuki et al. |
| 5,618,095 A | 4/1997 | Kashima et al. |
| 5,664,862 A | 9/1997 | Redmond et al. |
| 5,671,994 A | 9/1997 | Tai et al. |
| 5,719,649 A | 2/1998 | Shono et al. |
| 5,771,328 A | 6/1998 | Wortman et al. |
| 5,775,791 A | 7/1998 | Yoshikawa et al. |
| 5,779,337 A | 7/1998 | Saito et al. |
| 5,779,338 A | 7/1998 | Ishikawa et al. |
| 5,844,720 A | 12/1998 | Ohara et al. |
| 5,851,062 A | 12/1998 | Shinohara et al. |
| 5,890,791 A | 4/1999 | Saito |
| 5,917,664 A | 6/1999 | O'Neill et al. |
| 5,919,551 A | 7/1999 | Cobb, Jr. et al. |
| 5,961,198 A | 10/1999 | Hira et al. |
| 5,971,559 A | 10/1999 | Ishikawa et al. |
| 6,011,602 A | 1/2000 | Miyashita et al. |
| 6,036,329 A | 3/2000 | Iimura |
| 6,091,547 A | 7/2000 | Gardiner et al. |
| 6,120,280 A | 9/2000 | Mimura et al. |
| 6,130,730 A | 10/2000 | Jannson et al. |
| 6,151,169 A | 11/2000 | Kim |
| 6,707,611 B2 * | 3/2004 | Gardiner et al. ............ 359/619 |
| 6,712,481 B2 | 3/2004 | Parker et al. |
| 6,752,505 B2 * | 6/2004 | Parker et al. ............... 362/627 |
| 6,827,456 B2 | 12/2004 | Parker et al. |
| 7,090,389 B2 * | 8/2006 | Parker et al. ............... 362/627 |
| 7,212,345 B2 * | 5/2007 | Wilson ....................... 359/619 |
| 7,220,026 B2 * | 5/2007 | Ko et al. .................... 362/339 |
| 2001/0053074 A1 * | 12/2001 | Seetoh et al. ............ 362/244.1 |
| 2001/0053075 A1 * | 12/2001 | Parker et al. ................. 362/31 |
| 2004/0114346 A1 * | 6/2004 | Parker et al. ................. 362/31 |
| 2004/0246599 A1 * | 12/2004 | Nilsen ....................... 359/831 |
| 2005/0122591 A1 * | 6/2005 | Parker et al. ............... 359/619 |

* cited by examiner

LONG CURVED WEDGES IN AN OPTICAL FILM

CROSS-REFERENCE TO RELATED APPLICATIONS

This application claims the benefit of U.S. Provisional Application No. 60/624,894, filed Nov. 4, 2004.

FIELD OF THE INVENTION

This invention relates to the formation of a light redirecting polymeric film comprising a plurality of polymeric individual optical elements. In particular, the optical elements comprise curved wedge shaped features in the plane of the film, having a length in the range of 800 to 4000 micrometers.

BACKGROUND OF THE INVENTION

Light redirecting films are typically thin transparent optical films or substrates that redistribute the light passing through the films such that the distribution of the light exiting the films is directed more normal to the surface of the films. Typically, redirecting films are provided with ordered prismatic grooves, lenticular grooves, or pyramids on the light exit surface of the films which change the angle of the film/air interface for light rays exiting the films and cause the components of the incident light distribution traveling in a plane perpendicular to the refracting surfaces of the grooves to be redistributed in a direction more normal to the surface of the films. Such light redirecting films are used, for example, to improve brightness in liquid crystal displays (LCD), laptop computers, word processors, avionic displays, cell phones, PDAs and the like to make the displays brighter.

Previous light redirecting films suffer from visible moiré patterns when the light redirecting film is used with a liquid crystal or other display. The surface features of the light redirecting film interact with other optical films utilized in backlight assemblies, the pattern of printed dots or three-dimensional features on the back of the light guide plate, or the pixel pattern inside the liquid crystal section of the display to create moiré, an undesirable effect. Methods known in the art for reducing moiré have been to die cut the light redirecting films such that the lenticular array, is not parallel to any edge of the sheet, such that the lenticular array is at an angle relative to another light redirecting film or to the display electronics. Methods also used include randomizing the linear array by widths of the linear array elements, varying the height of the grooves in the linear array, adding a diffusing surface to the film on the side opposite the linear array, adding a diffusing film to the system, or rounding the ridges of the linear array. The above techniques to reduce moiré also cause a decrease in on-axis brightness or do not work to adequately solve the moiré problem. Moire and on-axis brightness tend to be related, meaning that a film with high on-axis gain would have high moiré in a system. It would be beneficial to be able to reduce the moiré while maintaining relatively high on-axis gain.

U.S. Pat. No. 5,919,551 (Cobb, Jr. et al) discloses a linear array film with variable pitch ridges and/or grooves to reduce the visibility of moiré interference patterns. The pitch variations can be over groups of adjacent ridges and/or valleys or between adjacent pairs of ridges and/or valleys. While this varying of the pitch of the linear array elements reduces moiré, the linear elements of the film still interact with the dot pattern on the backlight light guide and the electronics inside the liquid crystal section of the display. It would be desirable to break up the linear array of elements to reduce or eliminate this interaction.

U.S. Pat. No. 6,354,709 discloses a film with a linear array that varies in height along its ridgeline and the ridgeline also moves side to side. While the film does redirect light and its varying height along the ridgeline slightly reduces moiré, it would be desirable to have a film that significantly reduces the moiré of the film when used in a system while maintaining a moderately high on-axis gain.

U.S. Pat. No. 6,583,936 (Kaminsky et al) discloses a patterned roller for the micro-replication of light polymer diffusion lenses. The patterned roller is created by first bead blasting the roller with multiple sized particles, followed by a chroming process that creates micro-nodules. The manufacturing method for the roller is well suited for light diffusion lenses that are intended to diffuse incident light energy.

PROBLEM TO BE SOLVED BY THE INVENTION

There is a need for a light redirecting film that has high on axis brightness while reducing moiré such that the moiré patterns are not visible when viewing display devices. Further, there is a need for a light redirecting film that has high visible light transmission.

SUMMARY OF THE INVENTION

It is an object of the invention to provide a light redirecting film that reduces moiré while maintaining high gain.

It is another object to provide a light redirecting film that has low propensity to curl or scratch.

It is a further object to provide a light redirecting film that is customizable to the display backlight configuration and output.

These and other objects of the invention are accomplished by a light redirecting polymeric film comprising a plurality of polymeric individual optical elements on or in a polymeric film or substrate, wherein the elements comprise curved wedge shaped features in the plane of the film, having a length in the range of 800 to 4000 micrometers.

ADVANTAGEOUS EFFECT OF THE INVENTION

The invention provides a light redirecting film made of wedge shaped individual optical elements that significantly reduces moiré when used in a liquid crystal system while maintaining relatively high on-axis gain.

DETAILED DESCRIPTION OF THE INVENTION

Figure 1:
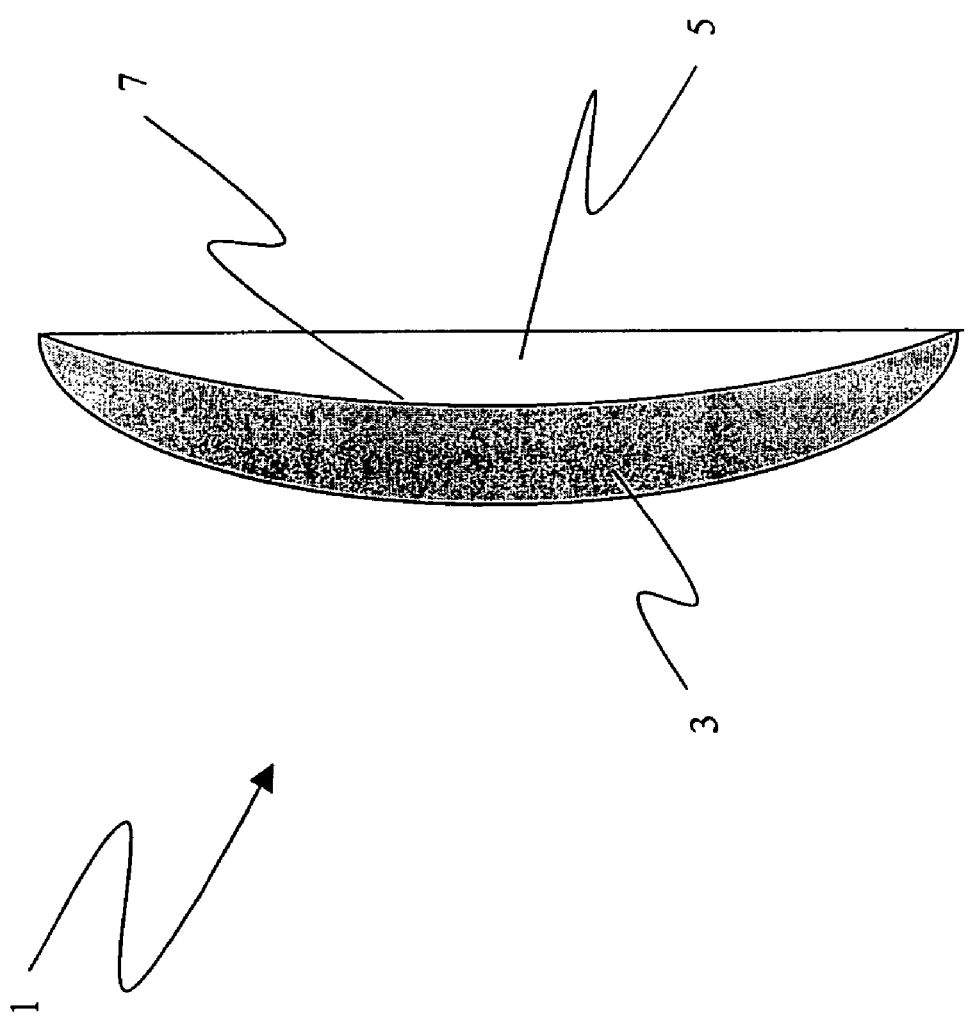
FIG. 1 is a schematic drawing of a single curved wedge shaped individual optical element, with one curved surface and one planar surface.

The invention has numerous advantages compared to current light redirecting films. The film's wedge shaped individual optical elements' sizes and placement on the film balance the tradeoffs between moiré reduction and on-axis gain producing relatively high on-axis gain while significantly reducing moiré. Moire patterns result when two or more identical repeating patterns of lines, dots, or circles are overlapped with imperfect alignment, or when non-identical but correlated patterns are overlapped. The resulting moiré pattern is a pattern of repeating light and dark lines or fringes. The line size and frequency depend on the two patterns interacting. In a display device such as a LCD display, moiré patterns that can be observed by the viewer of the LCD device are objectionable as they interfere with the quality of the displayed information. The light redirecting film of the invention reduces moiré compared to prior art light redirecting films while maintaining high on-axis gain. As the long dimension of the optical elements lengthens the pattern becomes one-dimensional and a moiré pattern can develop. As the long dimension of the optical elements is shortened the screen gain is reduced. Because the film is a unitary structure of polymer, there are fewer propensities to curl. When the film is made of two layers, it has a tendency to curl because the two layers typically react differently (expand or contact) to different environmental conditions (for example, heat and humidity). Curl is undesirable for the light redirecting film in an LCD because it causes warping of the film in the display that can be seen through the display. Further, warping of optical films changes the angle of incident light energy causing a loss in optical efficiency. The invention utilizes polymers that resist scratching and abrasion and have been shown to be mechanically tougher compared to prior art optical films constructed from UV cured polyacrylate.

The light redirecting film, because the individual optical elements are curved wedge shaped features, can redirect a portion of the light traveling in a plane parallel to the ridgelines of the elements. Furthermore, the light redirecting film of the invention can be customized to the light source and light output of the light guide plate in order to more efficiently redirect the light. The individual optical elements make the film very flexible in design, allowing different individual optical elements or different size or orientation to be used throughout the film surface to process the light entering the film most efficiently. For example, if the light output as a function of angle was known for all points on the light guide plate, a light redirecting film using curved wedge shaped features having different shapes, sizes, or orientation over the film could be used to efficiently process the light exiting the light guide plate. These and other advantages will be apparent from the detailed description below.

The term as used herein, "transparent" means the ability to pass radiation without significant deviation or absorption. For this invention, "transparent" material is defined as a material that has a spectral transmission greater than 90%. The term "light" means visible light. The term "polymeric film" means a film comprising polymers. The term "polymer" means homopolymers, co-polymers and polymer blends.

The term "optical gain", "on axis gain", or "gain" means the ratio of output light intensity divided by input light intensity. Gain is used as a measure of efficiency of a redirecting film and can be utilized to compare the performance of light redirecting films.

Individual optical elements, in the context of an optical film, mean elements of well defined shape, that are projections or depressions in the optical film. Individual optical elements are small relative to the length and width of an optical film. The term "curved surface" is used to indicate a three dimensional feature on a film that has curvature in at least one plane. "Wedge shaped features" is used to indicate an element that includes one or more sloping surfaces, and these surfaces may be a combination of planar and curved surfaces. Wedge shaped features can include at least 2 curved surfaces and can also have planar surfaces or no planar surfaces. The curved surfaces can be asymmetrical or noncircular. One example of a wedge shaped feature is found in FIG. 1.

The term "optical film" is used to indicate a thin polymer film that changes the nature of transmitted incident light. For example, a redirecting optical film provides an optical on-axis gain (output/input) greater than 1.0.

In one embodiment, the curved wedge shaped features have one curved surface and one planar surface. The curved surface can have curvature in one, two, or three axes and serves to redirect the light in more than one direction. FIG. 1 is a schematic drawing of a single curved wedge shaped individual optical element 1, with one curved surface 3 and one planar surface 5. Where the two surfaces come together, a ridge 7 is formed. The ridge is the apex formed where the sides of the element meet.

In another embodiment, the curved wedge shaped features have at least 2 curved surfaces. This allows the light redirecting film to redirect light in more than one direction. Additionally, the curved surfaces may be asymmetrical in shape.

In one embodiment, the curved wedge shaped elements of the invention are randomly placed and parallel to each other. This causes the ridges to be generally aligned in the same direction. A film having generally oriented ridgelines redirects more of the light in one direction than the other which creates higher on-axis gain when used in a liquid crystal backlighting system. As shown in FIG. 1, the ridge 7 is curved. This curvature can be in the plane of the film, perpendicular to the plane of the film, or both, as is the case in FIG. 1 (for example, the film can contain elements that curve in the width direction and the length direction). It is preferred to have elements with curvature in the plane of the film such that the elements can redirect light in more than one direction.

Figure 2:
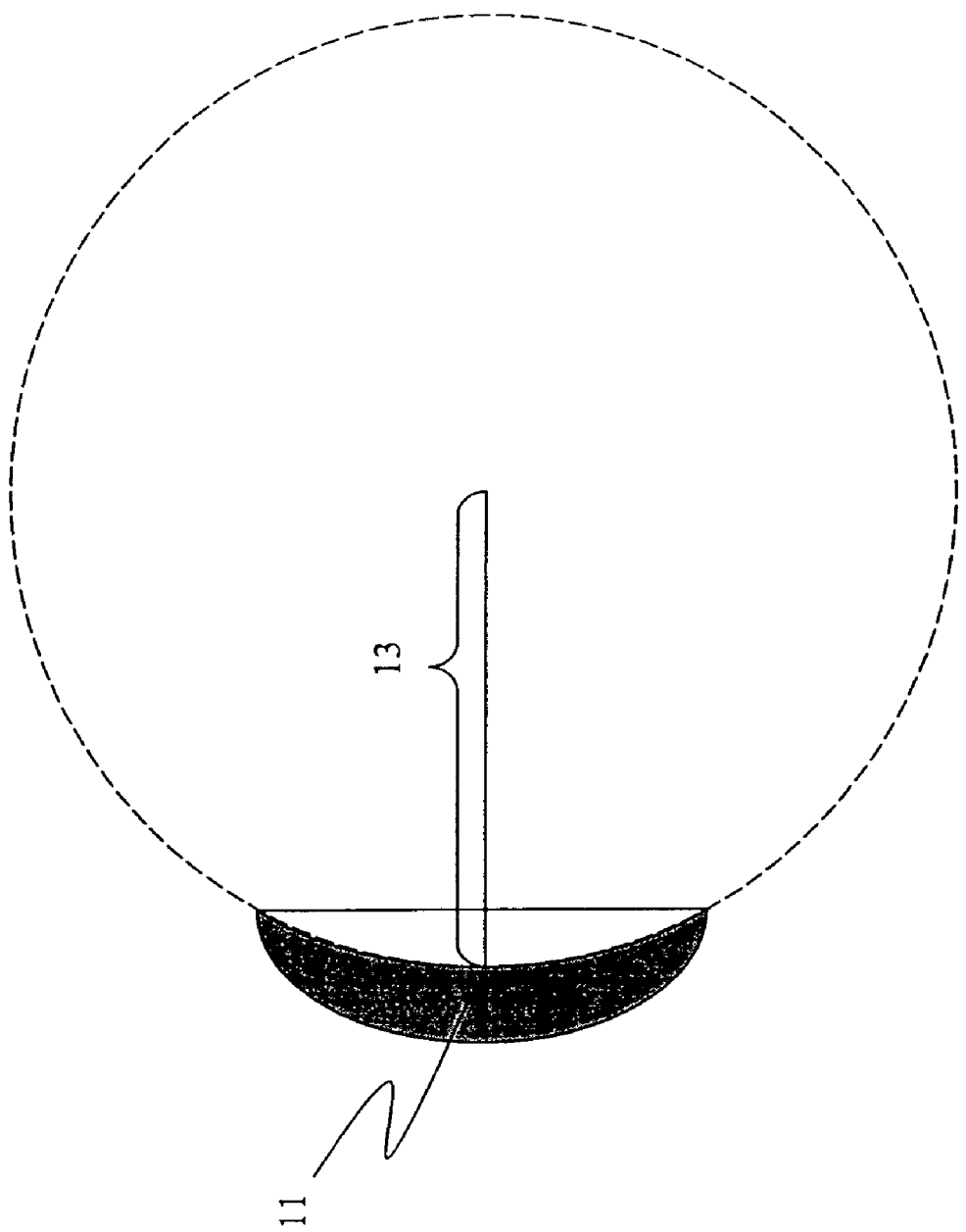
FIG. 2 is a schematic that shows the radius of curvature when the curve is a section of a circle.

The curvature of the ridgeline is a smooth arcuate curve, such as a part of a circle or an ellipse. The radius of curvature when the curve is a section of a circle, is shown in FIG. 2. The single curved wedge shaped element 11 is shown having a radius of curvature 13. A circle is fit to the curvature of the element and this circle's radius is the element's radius of curvature. The radius of curvature affects how much light is redirected in each direction and how much moiré and on-axis brightness the film will have. It has been found that a radius of curvature between 0.8 and 20 millimeters provides relatively high on-axis gain while significantly reducing the moiré when used in a display system, when compared to light redirecting films containing ordered prism structures used in similar display systems. As the radius of curvature is decreased, the on-axis gain is reduced.

Figure 3:
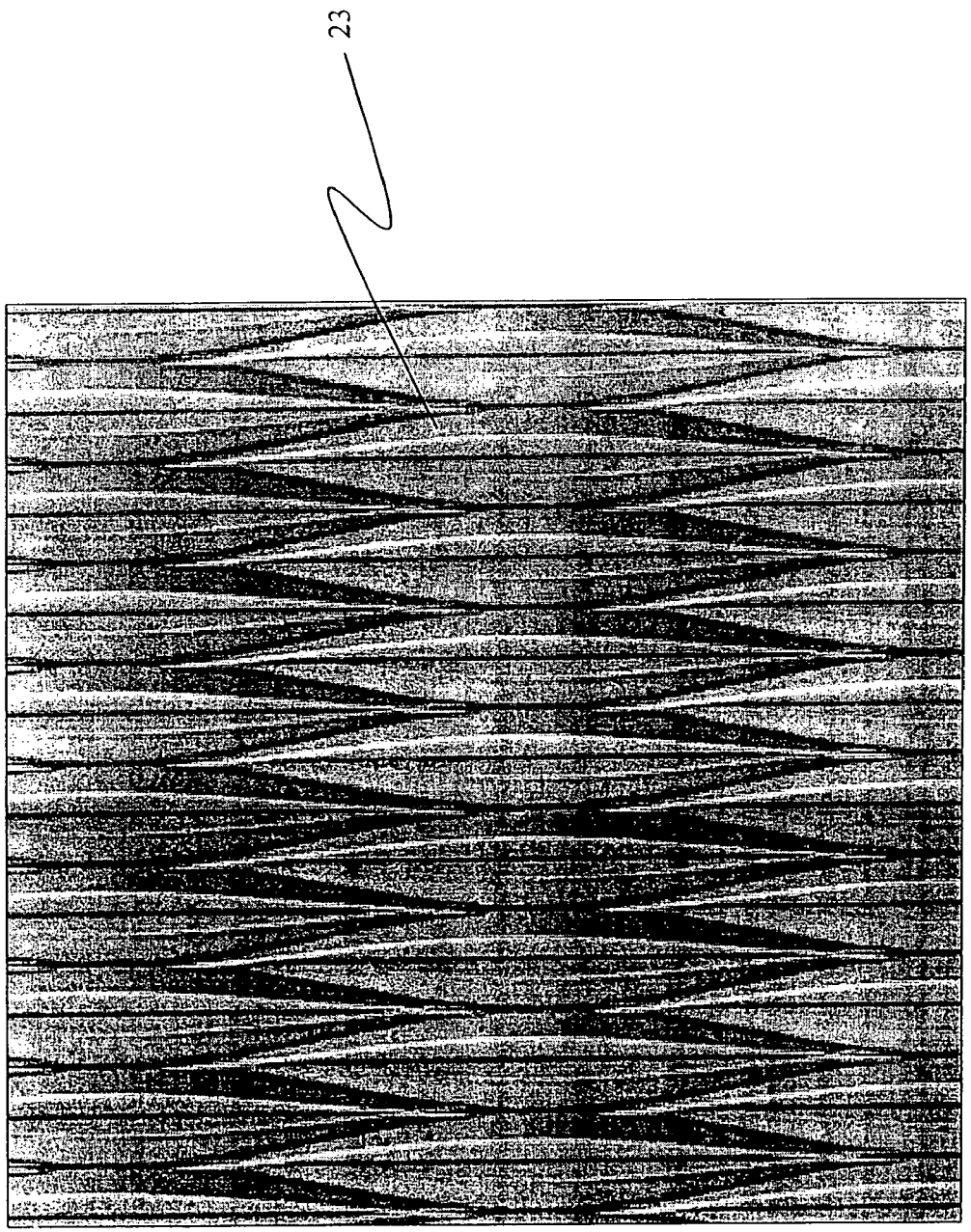
FIG. 3 shows an SEM image of one embodiment of the invention where the individual optical elements are mirrored relative to each other.

The curved wedge shaped elements can be placed in many configurations on the film and can be customized to the light output from the light guide plate. In one embodiment, about half of the curved wedge shaped features are rotated 180 degrees relative to each other. This creates equal redirection in the plane perpendicular to the ridges of the elements and normal to the surface of the substrate, when a non-symmetrical element is used. This orientation of the curved features is shown in FIG. 3.

Figure 4:
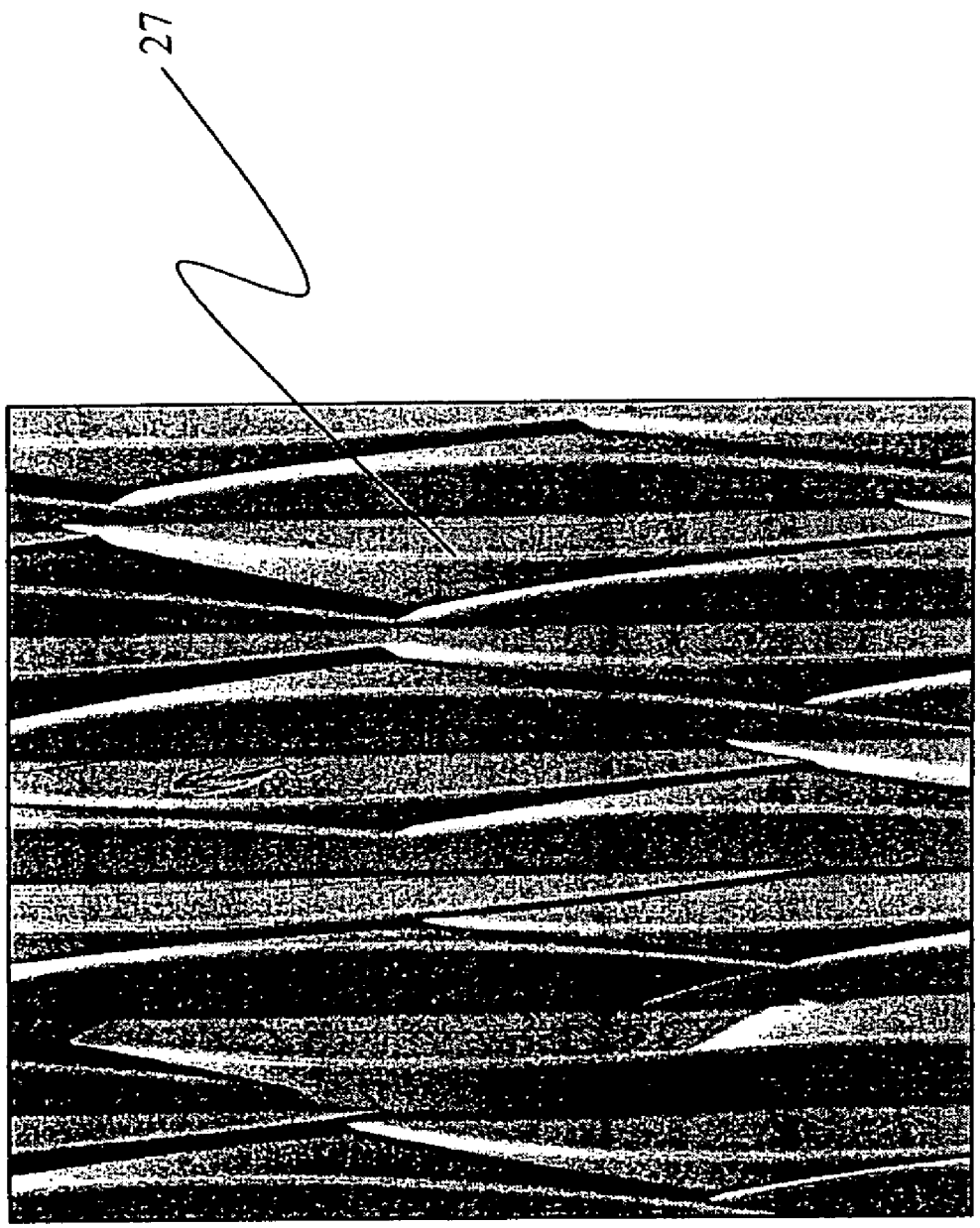
FIG. 4 shows an SEM image of one embodiment of the invention where the individual optical elements are staggered relative to each other and overlapping.

The curved wedge shaped features can be oriented in many ways on the light redirecting film. In one embodiment, the curved wedge shaped features are staggered with respect to one another. This staggering ensures good surface coverage of the features on the light redirecting film and reduced moiré in a system. FIG. 4 shows a scanning electron microscope (SEM) image of one such embodiment. Having the elements (one element shown as 27) staggered with respect to one another and overlapping allows for a tight packing of features and therefore little if any unpatterned area.

In another embodiment, the curved wedge shaped features are oriented opposite each other in a mirror configuration. In this mirrored configuration, pairs of features are arranged such that the features are mirror images of each other. FIG. 3 shows an SEM of one embodiment of the invention with curved wedge shaped features opposite each other in a mirror configuration. These mirrored pairs can be intersecting and overlapping themselves or other pairs. The pairs may be arranged such that there is no unpatterned area on the light redirecting film. In the case of the features with one curved surface and one flat surface, having the features arranged in mirrored pairs is beneficial to selectively change the amount of on-axis gain and moiré reduction. The planar side contributes more to on-axis gain, and the curved side contributes more towards moiré reduction.

Figure 5:
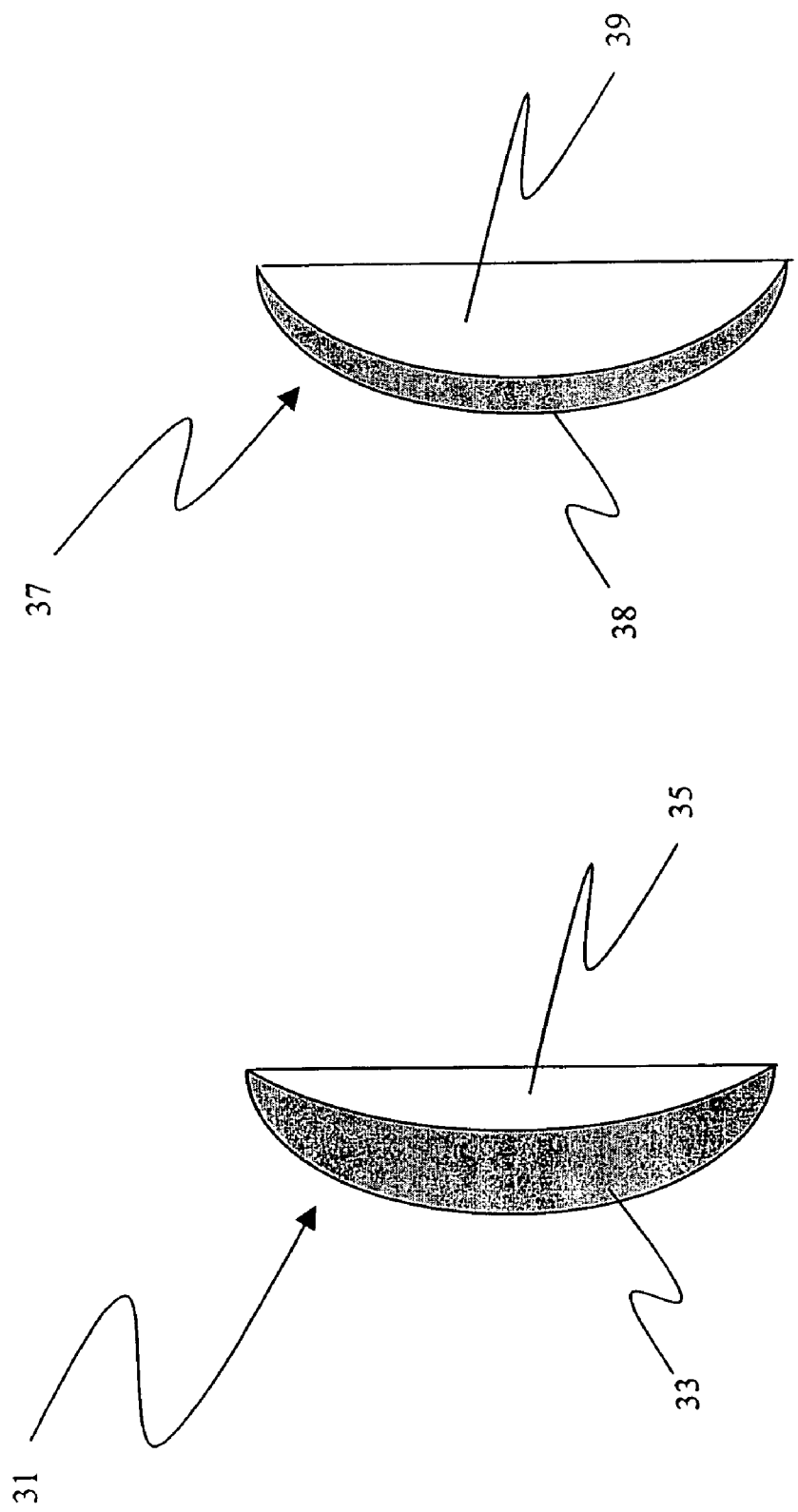
FIG. 5 shows a schematic drawing of two individual curved wedge shaped features that have the same length and width, but different radii of curvature leading to a different percentage of the surface of the element being curved or planar.

FIG. 5 is a schematic drawing of two individual curved wedge shaped features that have the same length and width, but different radii of curvature leading to a different percentage of the surface of the element being curved or planar. The two features 31 and 37 have different radii of curvature, feature 37 having a larger radius of curvature than feature 31. Therefore, the planar side 39 of feature 37 has a larger percentage of the surface area of the feature than planar side 35 of feature 31. The curved side 38 of feature 37 has a smaller percentage of the surface area of the feature than curved side 33 of feature 31. Tailoring the radius of curvature tailors the percentage of surface area that is planar or curved and can control the on-axis brightness and moiré in a system.

The individual optical elements preferably have a width of between 20 and 300 micrometers. When the elements have a width of greater than 450 micrometers, they become large enough that the viewer can see them through the liquid crystal display, detracting from the quality of the display. More preferably, the elements have a width of between 15 and 60 micrometers. It has been shown that this range provides good light shaping characteristics and cannot be seen by the viewer through a display. The specific width used in a display device design will depend, in part, on the pixel pitch of the liquid crystal display. The element width can be chosen to minimize moiré interference.

The curved wedge shaped features preferably have a maximum ridge height of the feature of between 10 and 150 micrometers. When the elements have a height of greater than 190 micrometers, they become large enough that the viewer can see them through the liquid crystal display, which is undesirable. When the elements have a height of less than 5 micrometers, the on-axis gain of the film decreases. It has been shown that this range of heights of the wedge shaped elements provide designs with significant moiré reduction. The height of the element also depends on the thickness of the film; the film has to be thick enough to support the wedge shaped features. In some embodiments, it is desired to have the thickness of the light directing film at least twice the height of the wedge shaped features. The thickness of the light redirecting film can be in the range of between 50 to 500 micrometers depending upon application, with larger sized LCD type displays having thicker films and smaller hand held displays having thinner films. The film thickness may be outside of this range for certain applications. The shapes may change in size and density relative to the thickness of the film.

In one embodiment, the curved wedge shaped features have a cross section with a 80-110 degree included angle at the highest point of the feature. It has been shown that these ridge angles produce the high on-axis brightness for the light redirecting film. When the angle of the ridge is less than 75 degrees or more than 115 degrees, the on-axis brightness for the light redirecting film decreases.

The curved wedge shaped features have an average pitch of between 10 and 100 micrometers. The average pitch is the average of the distance between the highest points of two adjacent features. The average pitch is different than the width of the features because the features vary in dimension and they are overlapping, intersecting, and randomly placed on the surface of the film to reduce moiré and to ensure that there is no unpatterned area on the film. In some embodiments, it is preferred to have less than 0.1% unpatterned area on the film, because unpatterned area does not have the same optical performance as the wedge shaped elements, leading to a decrease in on-axis gain.

Figure 6:
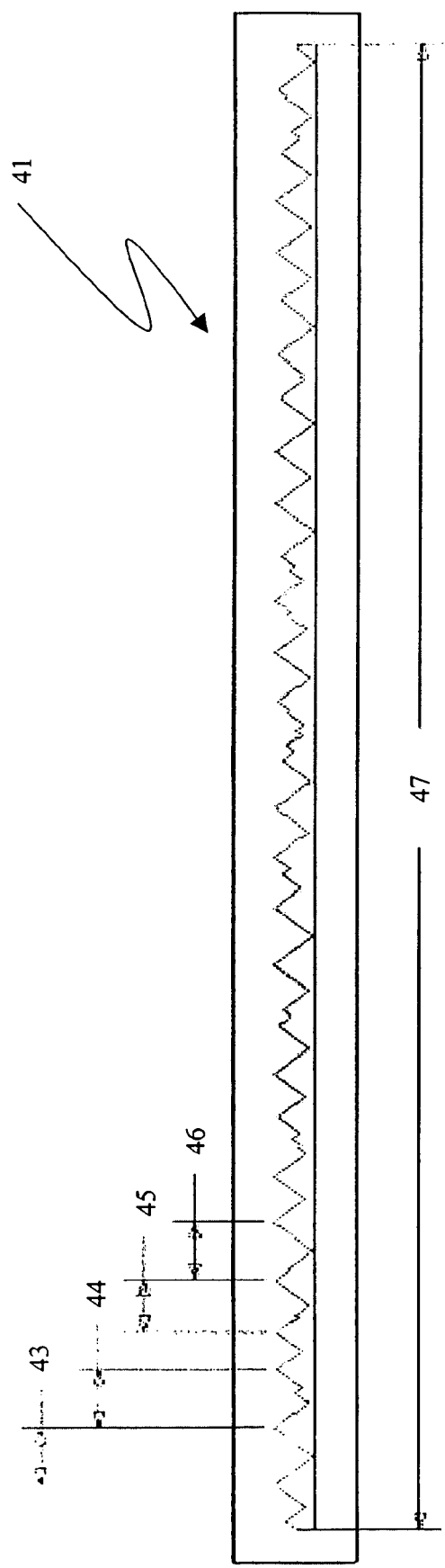
FIG. 6 is a schematic of a cross-section of the light management film of the invention.

FIG. 6 is a schematic cross-section of the light management film of the invention 41. The pitch of each of the features with its neighboring feature varies across the film. For example, pitches 43, 44, 45, 46 are of different lengths. The average pitch of the features is calculated by taking a section of the cross-section of the film 47 and dividing it by the number of ridges in that section.

In one embodiment, the index of refraction of the film is between 1.4 and 2.0. It has been found that the higher the index of refraction of the film, the more light redirecting power the film possesses. The film redirects by recycling light and refracting light. In the recycling process, a portion of the light that strikes the light redirecting film is reflected back through the lower elements of the display module, (for example diffuser and light guide). This light is then reflected by the back reflector or other display components back toward the light redirecting film again. A portion of this light can now be redirected by the film though the display with low loss, with the remaining portion of light being available for further recycling.

In one embodiment the individual optical elements comprise polycarbonate. Polycarbonates have high optical transmission values and are also tough and durable. This durability of polycarbonate makes the light redirecting film of the invention less prone to scratching than other typical light redirecting films that are made of more fragile and brittle materials such as UV cured polyacrylate. Polycarbonates are available in grades for different applications and some are formulated for high temperature resistance, excellent dimensional stability, increased environmental stability, and lower melt viscosities.

In one embodiment, the polymeric film is an integral structure where the features and the film or substrate bearing the features comprise a unitary structure having no transition point between the features and the unfeatured portion of the film. Having the features integral to the bulk of the film leads to several advantages. First, because the film is made of the same polymer, there is no index of refraction change as there would be if the features were coated or applied to a substrate. Having no index of refraction change means that there are no reflections losses from an internal interface and higher light transmission efficiency. Second, because the film is a unitary structure, there are fewer propensities to curl. When the film is made of two layers, it has a tendency to curl because the two layers typically react differently (expand or contact) to different environmental conditions (for example, heat and humidity). Curl is undesirable for the light redirecting film in an LCD because it causes warping of the film in the display that can be seen through the display and causes a loss of optical efficiency as incident angles for light energy change over the curved surface.

In addition, one or more surfaces of the light redirecting film or of the individual optical elements, can have one or more of a texture, coating, dye, light emitting layer, matte finish, diffuse finish, specular finish, and optically smooth finish to produce a desired effect in the light output distribution of the film. Here optically smooth finish is used to describe a surface finish that will allow light to be transmitted though the surface with little or no light scattering.

In one embodiment the individual optical elements on or in the surface of the films are preferably randomized in such a way as to eliminate any interference with the pixel spacing of a liquid crystal display. This randomization can include the size, shape, position, depth, orientation, angle or density of the optical elements. This may eliminate the need for diffuser layers to defeat moiré and similar effects. Also, at least some of the individual optical elements may be arranged in groupings across the exit surface of the films, with at least some of the optical elements in each of the groupings having a different size or shape characteristic that collectively produce an average size or shape characteristic for each of the groupings that varies across the films to obtain average characteristic values beyond machining tolerances for any single optical element and to defeat moiré and interference effects with the pixel spacing of a liquid crystal display. In addition, at least some of the individual optical elements may be oriented at different angles relative to each other for customizing the ability of the films to reorient/redirect light along two different axes. It is important to the gain performance of the films to avoid flat, unfaceted surface areas when randomizing features. Algorithms exist for pseudo-random placement of these features that avoid unfaceted or flat areas.

The angles that the light redirecting surfaces of the individual optical elements make with the light exit surface of the films may also be varied across the display area of a liquid crystal display to tailor the light redirecting function of the films to a light input distribution that is non-uniform across the surface of the light source.

The individual optical elements of the light redirecting films may also overlap each other, in a staggered, interlocked and/or intersecting configuration, creating an optical structure with excellent surface area coverage. Moreover, the individual optical elements may be arranged in groupings with some of the individual optical elements oriented along one axis and other individual optical elements oriented along another axis. Also, the orientation of the individual optical elements in each grouping may vary. Further, the size, shape, position and/or orientation of the individual optical elements of the light redirecting films may vary to account for variations in the distribution of light emitted by a light source.

The properties and pattern of the individual optical elements of the light redirecting films may also be customized to optimize the light redirecting films for different types of light sources which emit different light distributions, for example, one pattern for single bulb laptops, another pattern for double bulb flat panel displays, CCFL light source, LED light source and so on.

Further, light redirecting film systems may be provided in which the orientation, size, position and/or shape of the individual optical elements of the light redirecting films are tailored to the light output distribution of a backlight or other light source to reorient or redirect more of the incident light from the backlight within a desired viewing angle. Also, the backlight may include individual optical deformities that redirect light along one axis and the light redirecting films may include individual optical elements that redirect light along another axis perpendicular to the one axis.

Figure 7:
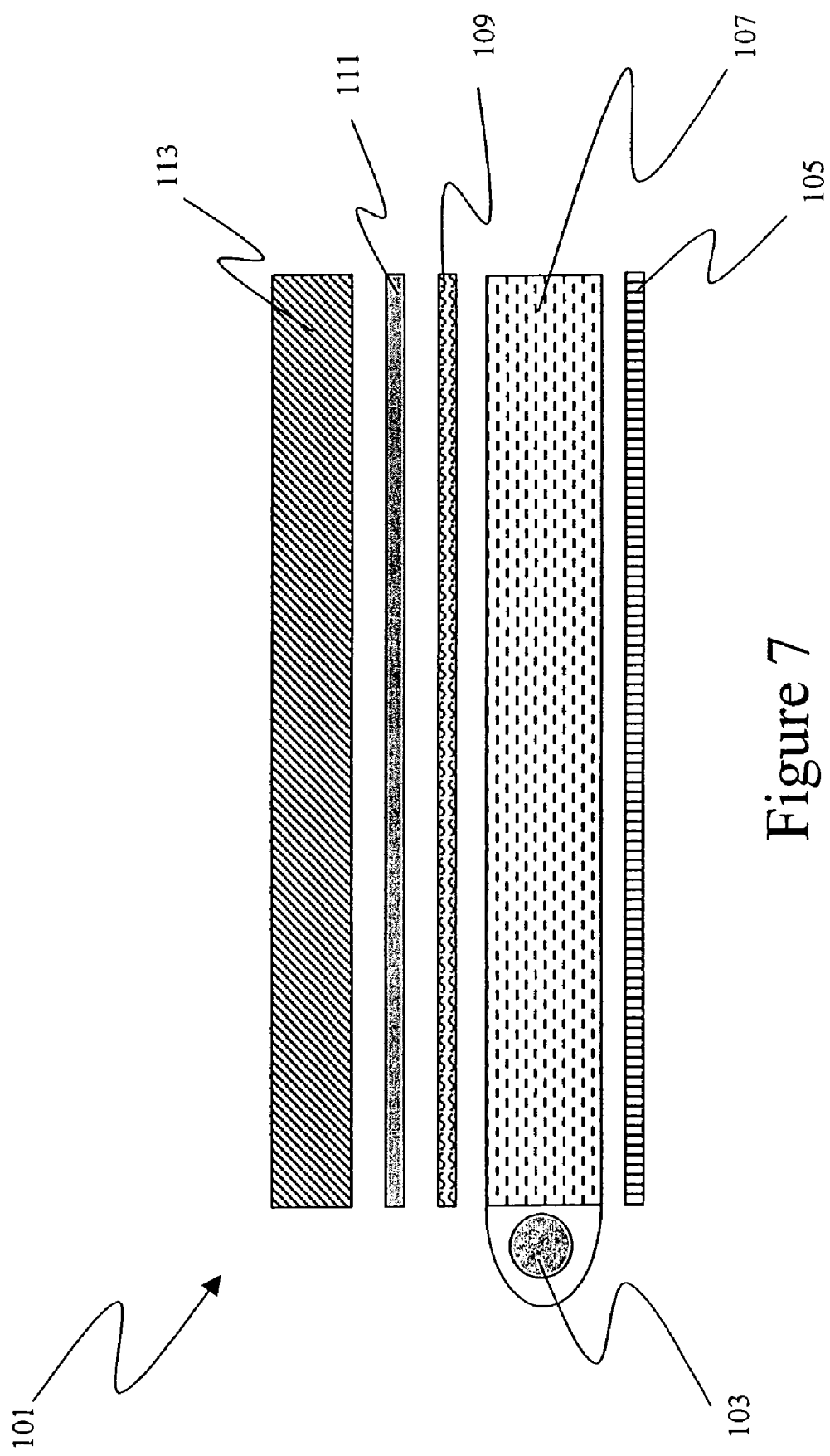
FIG. 7 is a schematic of a liquid crystal display incorporating the light redirecting polymeric film.
Figure 8:
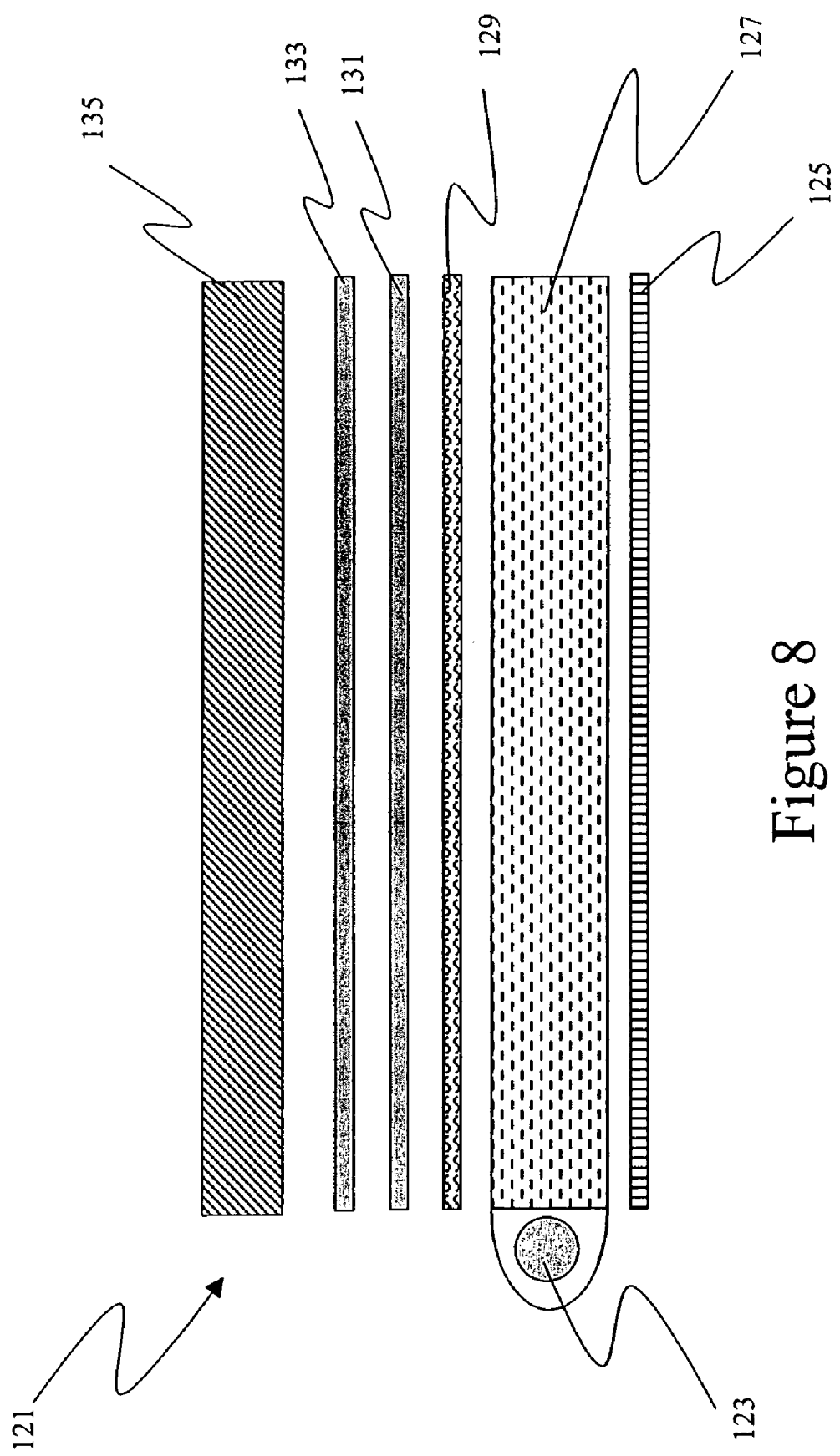
FIG. 8 is a schematic of a liquid crystal display incorporating two light redirecting polymeric films.

FIG. 7 shows one example of a display 101 where the light redirecting polymeric film 111 is incorporated into a liquid crystal display. Light is output by the light source 103 into the light guide 107. The light source 103 is typically a cold fluorescent bulb or LEDs, but can be any source capable of producing light. The light guide 107 may be tapered or a slab and has a back reflector 105 on one side of the light guide 107. The light exits the light guide through the side opposite to the back reflector 105 and may pass through a diffuser 109. The diffuser 109 serves to even the light output of the light guide 107 across the display, hide any features that are sometimes printed onto or embossed into the light guide, and reduce moiré. Next the light passes through the light redirecting film 111, with the light exiting the light redirecting film 111 in a narrower cone compared to the light entering the film. The light redirecting film 111 is preferably oriented such that the individual optical elements are on the surface facing away from the light guide 107. The light then enters the liquid crystal display module 113. Between the light redirecting film and the liquid crystal section there can be other films such as a top diffuser or a reflective polarizer. The wedge shaped features on the light redirecting film 111 may have pitch or angular orientation that are varied or randomized relative to the dimensions, pitch or angular orientation of the pixels or other repeating elements such that moiré patterns are not visible through the LCD panel FIG. 8 shows a display 121 where two light redirecting polymeric films 131 and 133 are incorporated into a liquid crystal display. The setup is similar to FIG. 8, where light is output by the light source 123 into the light guide 127. The light source 123 is typically a cold fluorescent bulb or LEDs, but can be any source capable of producing light. The light guide 127 may be tapered or a slab and has a back reflector 125 on one side of the light guide 127. The light exits the light guide through the side opposite to the back reflector 125 and may pass through a diffuser 129. The diffuser 129 serves to even the light output of the light guide 127 across the display, hide any features that are sometimes printed onto or embossed into the light guide, and reduce moiré. Next the light passes through the light redirecting film 131 and light redirecting film 133. The two light redirecting films are crossed such that the length direction of the wedge shaped features on the films are at an angle of 80 to 100 degrees relative to one another, preferably at 90 degrees relative to each other. Both light redirecting films 131 and 133 are preferably oriented such that the individual wedge shaped optical elements face away from the light guide 127, but the redirecting films could also be used with the wedge shaped features facing towards the light guide for some applications. In other embodiments, the light redirecting films can have wedge shaped features on both sides of the film or can have a different texture on the side of the film opposite the wedge shaped features, such as a diffuse texture. The light then enters the liquid crystal display module 135. Between the light redirecting film and the liquid crystal section there can be other films such as a top diffuser or a reflective polarizer. Preferably, the wedge shaped features on the light redirecting film 131 and 133 have pitch or angular orientation that are varied or randomized relative to the dimensions, pitch or angular orientation of the pixels or other repeating elements such that moiré patterns are not visible through the LCD panel.

Figure 9:
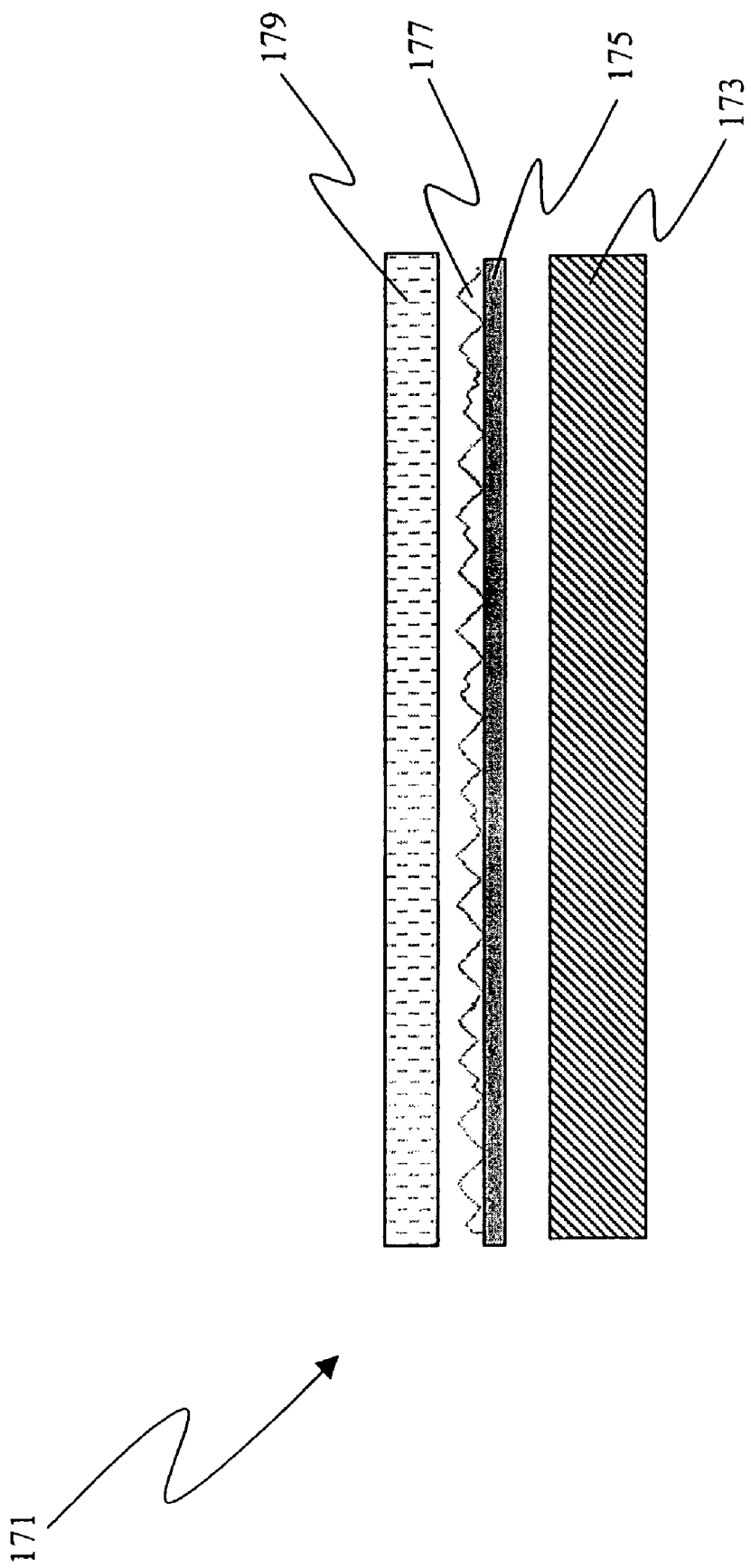
FIG. 9 is a schematic of a display system that includes a display and a light redirecting film with the wedge shaped elements on the far surface of the light redirecting film relative to the light source.

FIG. 9 shows a display system 171 that includes a light source 173, a light redirecting film 175 with wedge shaped elements 177, and a display 179. The display 179 can be any type of display including a liquid crystal display or an organic light emitting diode display (OLED). The display 179 can be active, passive, or static. The light redirecting film 175 has the wedge shaped features 177 on the far surface of the light redirecting film 175 relative to the light source 173. The display system 171 could also have a second light redirecting film (not shown) that may be crossed, preferably 80 to 100 degrees, with respect to the length direction of the wedge shaped elements of the light redirecting film 175.

Figure 10:
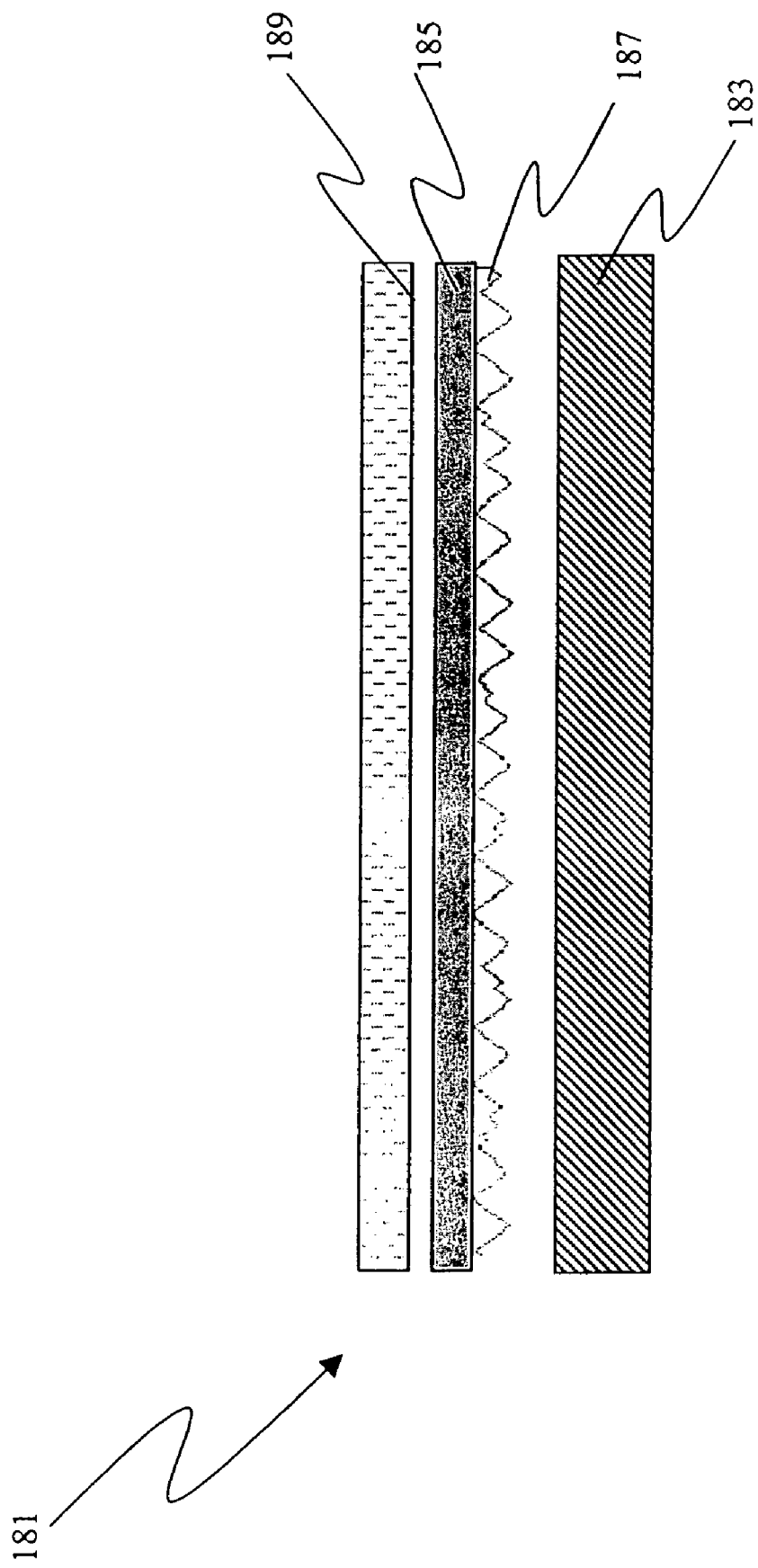
FIG. 10 is a schematic of a display system that includes a display and a light redirecting film with the wedge shaped elements are on the near surface of the light redirecting film relative to the light source.

FIG. 10 shows a display system 181 that is similar to the display system 171, except that the light redirecting film 185 has the wedge shaped features 187 on the near surface of the light redirecting film 185 relative to the light source 183. The display system 181 includes a light source 183, a light redirecting film 185 with wedge shaped features 187, and a display 189. The display 189 can be any type of display including a liquid crystal display or an organic light emitting diode display (OLED). The display system 181 could also have a second light redirecting film (not shown) that may be crossed, preferably 80 to 100 degrees, with respect to the length direction of the wedge shaped elements of the light redirecting film 185.

Preferably, the light redirecting film of the invention in a liquid crystal display system has an on-axis gain of at least 1.3. The light redirecting film of the invention balances high on-axis gain with reduced moiré. It has been shown that an on-axis gain of at least 1.3 is preferred by LCD manufacturers to significantly increase the brightness of the display.

Visually, the moiré effect refers to a geometrical interference between two similar spatial patterns. The interference is most apparent between patterns that contain the same or nearly the same periodicities or harmonics. The moiré pattern is a result of the sum and differences of the screens' periodic components. The resulting observable moiré pattern has a lower frequency than either of the two original patterns, an amplitude that is dependent on the strength of the harmonic components that are beating, and an orientation that depends on the relative orientation of the two patterns. For example the moiré pattern produced by two square wave transmission gratings of equal period, p, vertically aligned and oriented at angle, $\theta$, with respect to each other will be horizontally oriented with a period approximately equal to $p/\theta$ and have a line shape that is given by the convolution of the individual grating line shape. Obviously as the angle goes to zero the period gets infinitely wide. However, for perfectly aligned screens, moiré is observable when they have nearly identical periods. The resulting moiré pattern will have a period equal to $p1*p2/(p1-p2)$, where p1 and p2 are the two screen periods. For example if grating 1 has a period p1=0.05 mm and grating 2 has a period p2=0.0501 mm, the resulting moiré period will be 25 mm.

Gratings with apparently significantly different periods can produce moiré effects if they have harmonics that are close in frequency. A square wave screen having period p1 will have harmonics that are multiples, n, of 1/p1, that is n/p1. The beating of these harmonics with the fundamental of a second screen of period, p2, will produce beats having period equal to $p1*p2/(n*p2-p1)$. Consider the fifth harmonic (n=5) of a screen having period p1=0.25 mm and a screen with period p2=0.0501. The resulting moiré period is 25 mm.

Whether or not the resulting moiré will actually be observed depends on the resulting period and modulation. The combined visual impact of these parameters is contained in the Van Nes Bouman curve of contrast modulation threshold. This curve indicates the minimum contrast required for a viewer to observe a pattern, as a function of spatial frequency of the pattern given in cycles/degree. Generally the eye is most sensitive to frequencies between 2 and 10 cycles/degree, peaking at 5 cycles/deg. In this range the visual threshold is ~0.1% modulation. To convert the spatial period into spatial frequency in cycles/degree requires introducing the observers viewing distance. At a viewing distance of 18 inches, one degree subtends ~8 mm. Thus dividing 8 mm by the spatial period of the moiré pattern in mm yields its spatial frequency in cycles/degree. For the above examples, the moiré period of 25 mm corresponds to ~0.32 cycles/degree. At this spatial frequency the visual threshold is ~1% modulation. From Fourier analysis, pure square wave screens will have ~1.8% modulation, making them slightly visible to the viewer.

The key parameters regarding the visibility of the moiré pattern are the spatial frequency in cycles/degree and its modulation. Since these properties are derived from the underlying screens their construction parameters are key. As discussed in the examples above, straight line screens or screens that vary in only one direction will produce straight-line moiré patterns. The introduction of a curved structure into the pattern as in the wedge shaped features makes the pattern two-dimensional. Periodic placements will result in two-dimensional harmonic components. It is the beating of these periodic components with the periodicities of a thin film transistor (TFT) black matrix structure that can potentially produce moiré patterns. This two-dimensional pattern can be viewed as overlapping diamonds or sinusoids. As the long dimension of the wedge shaped feature lengthens the pattern becomes one-dimensional and a moiré pattern can develop as described above. As the long dimension of the wedge shaped feature is shortened the screen gain is reduced and therefore is not of interest. This in-between length wedge pattern can result in a moiré pattern as described above. The is similar to the moiré developed between the TFT and a linear screen except that the curved structure of the wedge shaped elements results in a lower contrast moiré pattern. Randomization that is introduced also helps break the periodicity, further reducing the observation of moiré.

Figure 11:
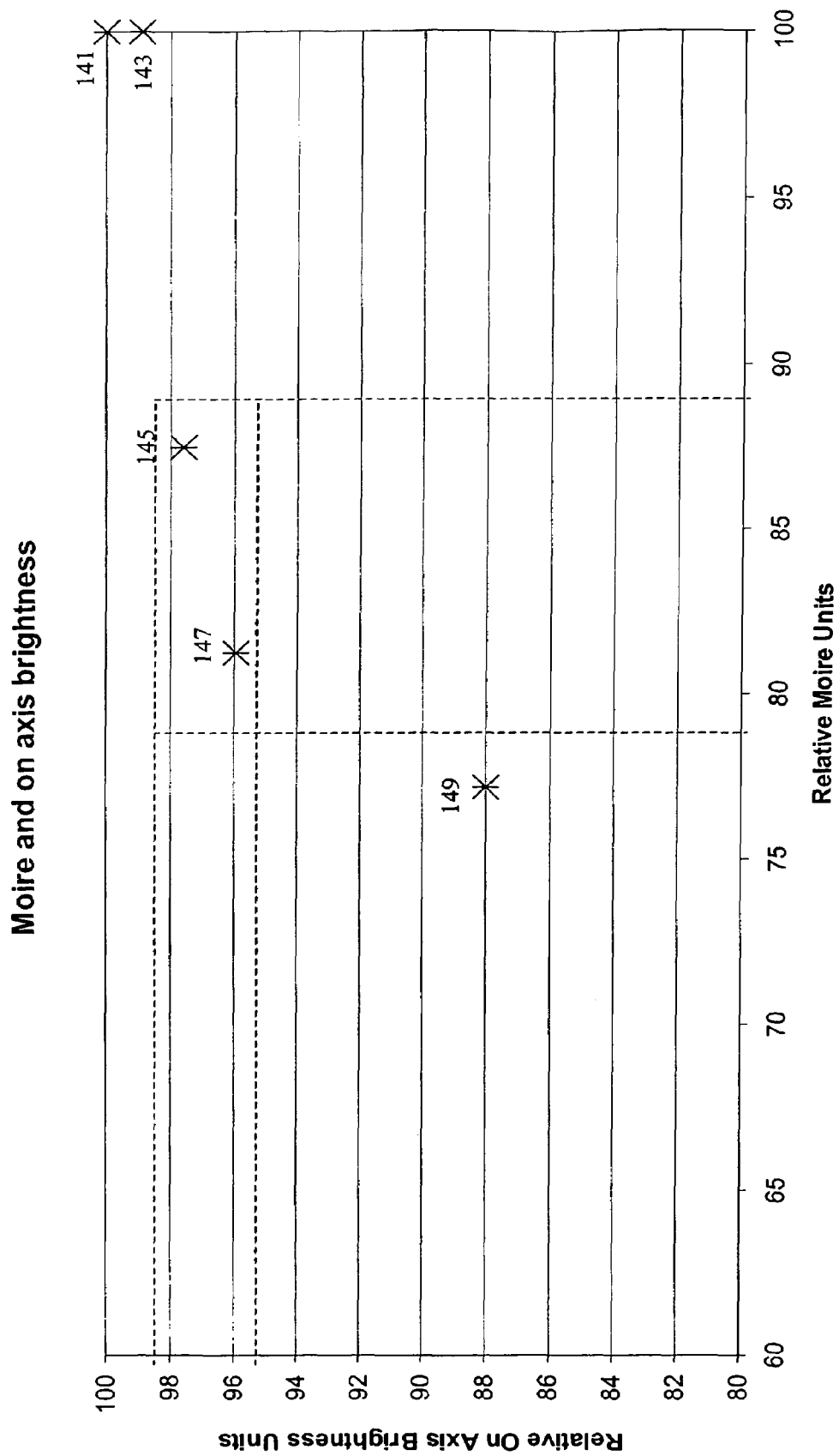
FIG. 11 is an optical optimization graph.

FIG. 11 shows an optical optimization graph. It is a graph of light redirecting films' on-axis gain versus moiré reduction (the higher the number for on-axis gain the brighter the display on-axis, the higher the moiré number, the greater amount of moiré in the system). Ideally, the perfect light redirecting film would be upper left hand corner of the graph with high on-axis gain and no moiré. In reality, moiré and on-axis gain are directly related and the methods used to reduce moiré also have a negative impact on-axis brightness. In the liquid crystal industry, as resolutions increase (making moiré more pronounced), there is a compromise position desired by the manufacturers in which moiré is significantly reduced while minimizing the loss of on-axis brightness. Prior attempts to create a film that fits this criteria have failed, producing films that reduce moiré very well, but have low on-axis brightness for many applications.

One manufacturing process for making the light redirecting film of this invention utilizes polymers that are melt extruded from a slit die. In general, a T die or a coat hanger die is used. The process involves extruding the polymer or polymer blend through a slit die and rapidly quenching the extruded web upon a precision patterned roller with the desired surface geometry so that the surface features of the transparent sheet are quenched below their glass solidification temperature, retaining the desired shape of the optical elements.

The film of the invention may also be manufactured by vacuum forming around a pattern, injection molding the surface features, using UV curable materials coated on a web then cured, and embossing the surface features in a polymer web.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passing through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, and electronic games for which light weight, low power consumption and long operating life are important features.

EXAMPLES

The following examples illustrate the practice of this invention. They are not intended to be exhaustive of all possible variations of the invention. Parts and percentages are by weight unless otherwise indicated.

Invention Example 1

Invention example 1 was produced in accordance with the invention as a monolithic structure (one layer) made of compact disk optical grade polycarbonate available from General Electric. The film was produced using extrusion roll molding wherein molten polycarbonate (extruded at approximately 315° C.) was extruded into a nip between a patterned roller and a smooth pressure roller. The resultant film was approximately 125 micrometers thick with one patterned side and one smooth side. The pattern consisted of curved wedge shaped features.

Invention example 1 had features that individually were, on average, 1360 micrometers long, 50 micrometers wide, and 24 micrometers high with a 90 degree included angle. The features were random, overlapping, and intersecting across the surface of the film such that the distance between the highest points of two adjacent features had an average pitch of approximately 35 micrometers.

Invention Example 2

Invention example 2 was prepared in the same manner as invention example 1 with the same materials, process, and thickness. Invention example 2 had features that individually were, on average, 950 micrometers long, 44 micrometers wide, and 22 micrometers high with a 90 degree included angle. The features were random, overlapping, and intersecting across the surface of the film such that the distance between the highest points of two adjacent features had an average pitch of approximately 22 micrometers.

Comparative Example 1

Comparative example 1 was a commercially available brightness enhancement film, the BEF II made by 3M. The BEF II is a dual layer structure (that may have a third layer for adhesion between the two layers) of an oriented polyester (approximately 100 micrometers thick) with the brightness enhancement features made of a coated then UV cured polyacryate (approximately 25 micrometers thick). The features are continuous linear prisms with a pitch of 50 micrometers, height of 25 micrometers, and an included angle of 90 degrees.

Comparative Example 2

Comparative example 2 was a commercially available brightness enhancement film, the BEF III-T made by 3M. The structure of the BEF III-T is similar to the BEF II, with slightly different features. The features are continuous linear prisms with an average pitch of 50 micrometers, an included angle of 90 degrees, and a variable height. The height varies along the length of the prism, giving the prism a "wavy" look. The ridgeline of the prism varies in height, but does not vary in the plane parallel to the plane of the film. The film was designed to reduce moiré in a system.

Comparative Example 3

Comparative example 3 has the same structure as invention examples 1 and 2, but with different features. The features were individually, on average, 400 micrometers long, 58 micrometers wide, and 29 micrometers high with a 90 degree included angle. The features were random, overlapping, and intersecting across the surface of the film such that the distance between the highest points of two adjacent features had an average pitch of approximately 35 micrometers.

Figure 12:
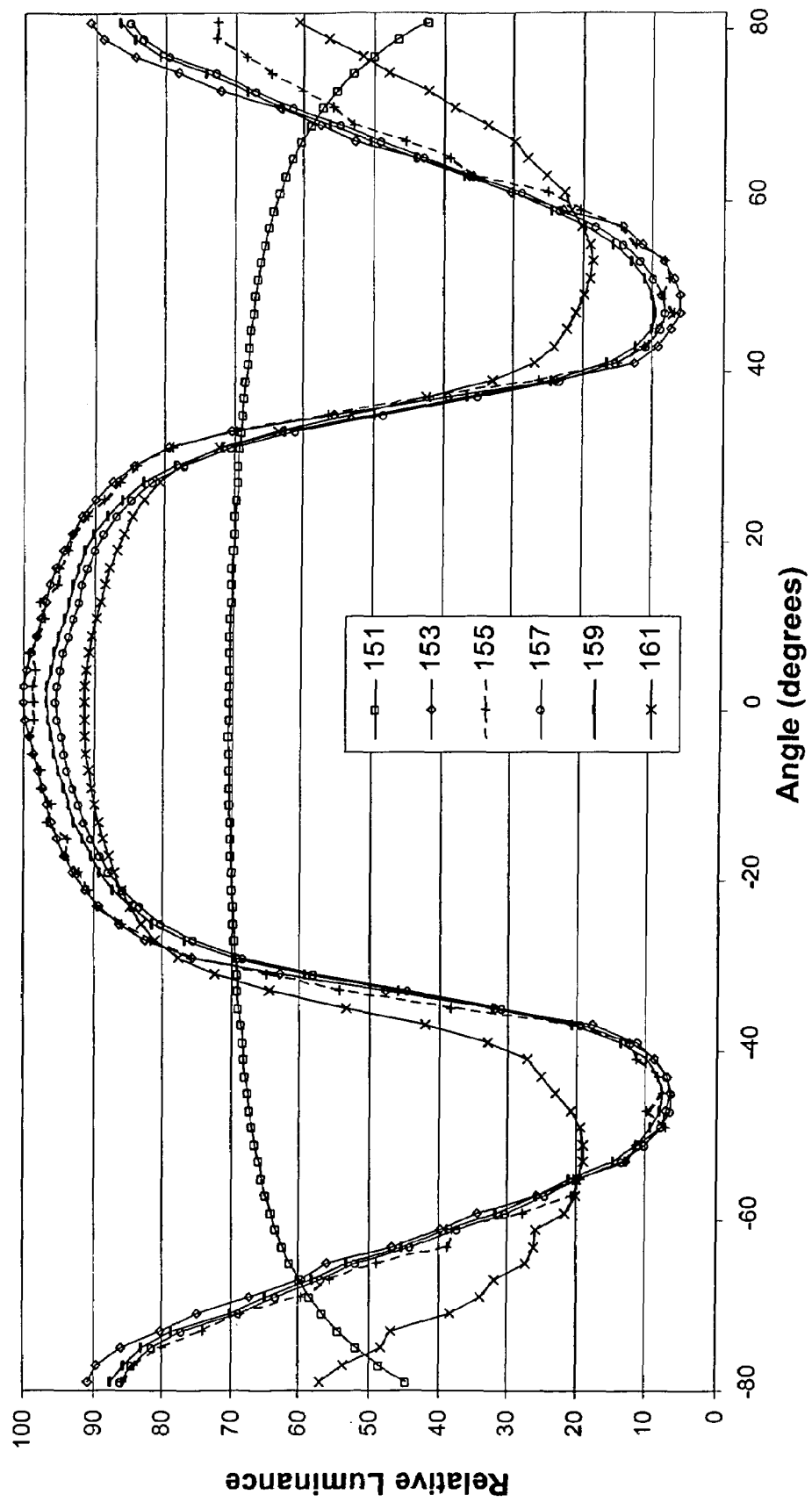
FIG. 12 is a graph of relative luminance versus angle of the examples.

The films were tested for their light redirecting properties by placing the film pattern side away from the light source, the light source being a diffuse, Lambertian light source. A 0 degree Azimuthal angle graph of relative luminance versus angle was used to compare brightness increases. The results are shown in FIG. 12, where 151 corresponds to the relative luminance versus angle of the Lambertian light source. The other series on the graph correspond to the relative luminance versus angle of the invention and comparison films in decreasing on-axis gain; 153—comparative example 1, 155—comparative example 2, 157—invention example 1, 159—invention example 2, 161—comparative example 3.

The light redirecting films of the invention and comparison examples listed above were visually assessed for moiré. The films were inspected on a white highly diffuse Lambertian backlight. Each film was placed such that the film's long axes of features were aligned parallel to the RGB LCD array placed on the film. Viewing was conducted off-axis where moiré shows up the worst. The range of resolutions that are typical for laptop sized displays were tested with the light redirecting films and the moiré was assessed visually and ranked relative to one another. The LCD panels had resolutions of 0.3075 mm, 0.298 mm, 0.279 mm, 0.264 mm, 0.2250 mm, 0.2175 mm, and 0.2055 mm. The films were ranked on a scale of 0 to 5 with 0 having no moiré and 5 have the most moiré. The visual ranking was as follows:

| Ranking | Definition of Moiré Appearance |
|---|---|
| 5 | Very Bad |
| 4 | Bad |
| 3 | Medium |
| 2 | Slight |
| 1 | Very Slight |
| 0 | None |

The data was then normalized. The following chart shows the ranking data and the relative ranking of moiré of the invention and comparative examples.

| | LCD Resolution (in mm) | | | | | | | Total Score | Relative Scoring of Moiré (Normalized) |
|---|---|---|---|---|---|---|---|---|---|
| | 0.3075 | 0.298 | 0.279 | 0.264 | 0.225 | 0.2175 | 0.2055 | | |
| Comparative Example 1 | 3 | 3 | 1 | 2 | 3 | 2 | 2 | 16 | 100 |
| Comparative Example 2 | 3 | 3 | 1 | 2 | 3 | 2 | 2 | 16 | 100 |
| Invention Example 1 | 3 | 1 | 2 | 2 | 3 | 2 | 1 | 14 | 88 |
| Invention Example 2 | 3 | 2 | 1 | 1 | 3 | 2 | 1 | 13 | 81 |
| Comparative Example 3 | 1 | 1 | 2 | 3 | 1 | 2 | 3 | 12.35 | 77 |

While moiré and on-axis brightness separately are important to a film's performance in a liquid crystal display system, balancing moiré reduction and on-axis gain is critical to the overall performance in a liquid crystal display. The challenge to reduce moiré while not significantly reducing on axis brightness has not been sufficiently met in the marketplace and previous attempts have not been successful. FIG. 11 shows an optical optimization graph of light redirecting films' on-axis gain versus moiré reduction (the higher the number for on-axis gain the brighter the display on-axis, the higher the moiré number the greater amount of moiré in the system). Ideally, the perfect light redirecting film would be upper left hand corner of the graph with high on-axis gain and no moiré. In reality, moiré and on-axis gain are inversely related and the methods used to reduce moiré have a negative impact on on-axis brightness. In the liquid crystal industry, as resolutions increase (making moiré more pronounced), there is a compromise position desired by the manufacturers in which moiré is significantly reduced while minimizing the loss of on-axis brightness, which is shown on FIG. 11 as the boxed area containing points 145 and 147, invention examples 1 and 2, respectively. Prior attempts to create a film that satisfies this criteria have failed, having films that reduce on-axis brightness without reducing moiré significantly and films that reduce moiré very well, but have low on-axis brightness for many applications. Point number 143—comparative example 2 reduces moiré, but as shown in the graph, FIG. 11, it reduces on-axis gain compared with point 141 (comparative example 1) without significantly decreasing moiré. Other attempts have produced very low moiré films, point 149—comparative example 3, but do not have sufficient on axis brightness for some applications, as in comparative example 3.

Since the invention films were constructed from polycarbonate polymer, the resulting light redirecting films were tough, scratch resistant and abrasion resistant compared to the control materials constructed from more delicate UV cured prism structures. Also, the polycarbonate polymer has been shown to provide consistent optical performance in the demanding conditions encountered in a LCD backlight assembly.

The invention has been described in detail with particular reference to certain preferred embodiments thereof, but it will be understood that variations and modifications can be effected within the spirit and scope of the invention.

| Parts List | |
|---|---|
| 1; | Single curved wedge shaped individual optical element |
| 3; | Curved surface |
| 5; | Planar surface |
| 7; | Ridge |
| 11; | Single curved wedge shaped individual optical element |
| 13; | Radius of curvature |
| 23; | Curved wedge element |
| 27; | Element |
| 31; | Feature |
| 33; | Curved side |
| 35; | Planar side |
| 37; | Feature |

-continued

| Parts List | |
|---|---|
| 38; | Curved side |
| 39; | Planar side |
| 41; | Cross-section of the light management film |
| 43; | Pitch |
| 44; | Pitch |
| 45; | Pitch |
| 46; | Pitch |
| 47; | Section of the cross-section of the film |
| 100; | Display |
| 101; | Light source |
| 103; | Back reflector |
| 105; | Light guide |
| 107; | Diffuser |
| 109; | Light redirecting polymeric film |
| 111; | Liquid crystal display module |
| 121; | Display |
| 123; | Light source |
| 125; | Back reflector |
| 127; | Light guide |
| 129; | Diffuser |
| 131; | Light redirecting film |
| 133; | Light redirecting film |
| 135; | Liquid crystal display module |
| 141; | Comparative example 1 |
| 143; | Comparative example 2 |
| 145; | Invention example 1 |
| 147; | Invention example 2 |
| 149; | Comparative example 3 |
| 151; | Relative luminance versus angle plot of light source |
| 153; | Relative luminance versus angle plot of comparative example 1 |
| 155; | Relative luminance versus angle plot of comparative example 2 |
| 157; | Relative luminance versus angle plot of invention example 1 |
| 159; | Relative luminance versus angle plot of invention example 2 |
| 161; | Relative luminance versus angle plot of comparative example 3 |
| 171; | Display system173; Light source |
| 175; | Light redirecting film |
| 177; | Wedge shaped features |
| 179; | Display |
| 181; | Display system173; Light source |
| 185; | Light redirecting film |
| 187; | Wedge shaped features |
| 189; | Display |

What is claimed is:

1. A light redirecting film comprising a plurality of individual polymeric optical elements on or in at least one surface of a polymeric film or substrate, wherein said optical elements have at least two surfaces, at least one of said surfaces being curved, and said optical elements having a length in the range of 800 to 2000 micrometers.

2. The film of claim 1 wherein said optical elements have one curved surface and one planar surface.

3. The film of claim 1 wherein said optical elements have at least two curved surfaces.

4. The film of claim 1 wherein said optical elements have at least one asymmetrical shaped surface.

5. The film of claim 1 wherein said optical elements are rotated relative to one another.

6. The film of claim 1 wherein about half of said optical elements are rotated 180 degrees relative to the remaining optical elements.

7. The film of claim 1 wherein said optical elements are staggered with respect to one another and intersect one another.

8. The film of claim 1 wherein said optical elements are opposite each other in a mirror arrangement.

9. The film of claim 1 wherein said optical elements are randomly placed.

10. The film of claim 1 wherein said optical elements have at least one curved surface with a radius of curvature of between 0.8 and 20 millimeters.

11. The film of claim 1 wherein said optical elements have a width of between 15 and 60 micrometers.

12. The film of claim 1 wherein said optical elements have a maximum ridge height of between 10 and 150 micrometers.

13. The film of claim 1 wherein said optical elements have a cross section with an 80-110 degree included angle at a highest point of said optical elements.

14. The film of claim 1 wherein said optical elements have a distance between highest points of two adjacent optical elements that provides an average pitch of between 10 and 100 micrometers.

15. The film of claim 1 wherein said polymeric film or substrate is made of polycarbonate.

16. The film of claim 1 wherein said polymeric film or substrate has an index of refraction of between 1.40 and 2.00.

17. The film of claim 1 wherein said light redirecting film has an on-axis gain of at least 1.3.

18. The film of claim 1 wherein said polymeric film or substrate has first and second surfaces, wherein at least one of said surfaces includes one or more of a texture, coating, dye, light emitting layer, matte finish, diffuse finish, specular finish, and optically smooth finish.

19. The film of claim 1 wherein said polymeric film or substrate has first and second surfaces, wherein at least one of said surfaces includes said optical elements and the other of said surfaces includes one or more of a texture, coating, dye, light emitting layer, matte finish, diffuse finish, specular finish, and optically smooth finish.

20. The film of claim 1 wherein said polymeric film or substrate has first and second surfaces with at least one of said surfaces comprising optical elements having one or more of a texture, coating, dye, light emitting layer, matter finish, diffuse finish, specular finish, and optically smooth finish.

21. The film of claim 1 wherein said optical elements have a length in the range of 950 to 1400 micrometers.

22. A display system comprising a backlight assembly having at least one light source and at least one light redirecting film for redirecting light received from said backlight assembly, said light redirecting film comprising a polymeric film or substrate having a plurality of individual polymeric optical elements on or in at least one surface of said polymeric film or substrate, wherein said optical elements have at least two surfaces, at least one of said surfaces being curved, and said optical elements have a length in the range of 800 to 2000 micrometers and a width of between 15 and 60 micrometers.

23. The display system of claim 22 comprising said one light redirecting film and further comprising a second light redirecting film, wherein said second light redirecting film is rotated at 80 to 100 degrees relative to a length direction of the individual optical elements on said first light redirecting film.

24. The display system of claim 22 further comprising at least one diffusing film.

25. The display system of claim 22 wherein at least some of said optical elements only have two surfaces.

26. The display system of claim 25 wherein said two surfaces of said optical elements are asymmetric.

27. The display system of claim 22 wherein said optical elements have at least one asymmetrical shaped surface.

28. The display system of claim 22 wherein said optical elements are on a far surface of the light redirecting film relative to the light source.

29. The display system of claim 22 wherein said optical elements are on a near surface of the light redirecting film relative to the light source.

30. The display system of claim 22 wherein said optical elements are on both a far surface and a near surface of the light redirecting film relative to the light source.

31. The display system of claim 22 wherein at least some of said optical elements have one curved surface and one planar surface.

32. The display system of claim 22 wherein said optical elements are randomly placed.

33. The display system of claim 22 wherein said optical elements are generally aligned.

34. The display system of claim 22 wherein said optical elements are placed such that the film has at least 95% surface coverage of said optical elements over any LC pixel area.

35. The display system of claim 22 wherein said optical elements have a radius of curvature of between 0.8 and 20 millimeters.

36. A light redirecting film comprising a plurality of individual polymeric optical elements on or in at least one surface of a polymeric film or substrate, wherein said optical elements have at least two surfaces, at least one of said surfaces being curved, and said optical elements having a length in the range of 800 to 2000 micrometers, wherein said optical elements and said polymeric film or substrate bearing the optical elements are a unitary structure having no transition point between the optical elements and any remaining portion of the polymeric film or substrate.

37. The film of claim 36 wherein said optical elements have a length in the range of 950 to 1400 micrometers and a width of between 15 and 60 micrometers.

38. The film of claim 36 wherein said optical elements have at least one curved surface with a radius of curvature of between 0.8 and 20 millimeters, and wherein said optical elements have a maximum ridge height of between 10 and 150 micrometers.

* * * * *